W. J. BROWN.
SUSPENSION DRIVE FOR SEWING MACHINES.
APPLICATION FILED JAN. 23, 1920.
1,398,498.
Patented Nov. 29, 1921.
2 SHEETS—SHEET 1.
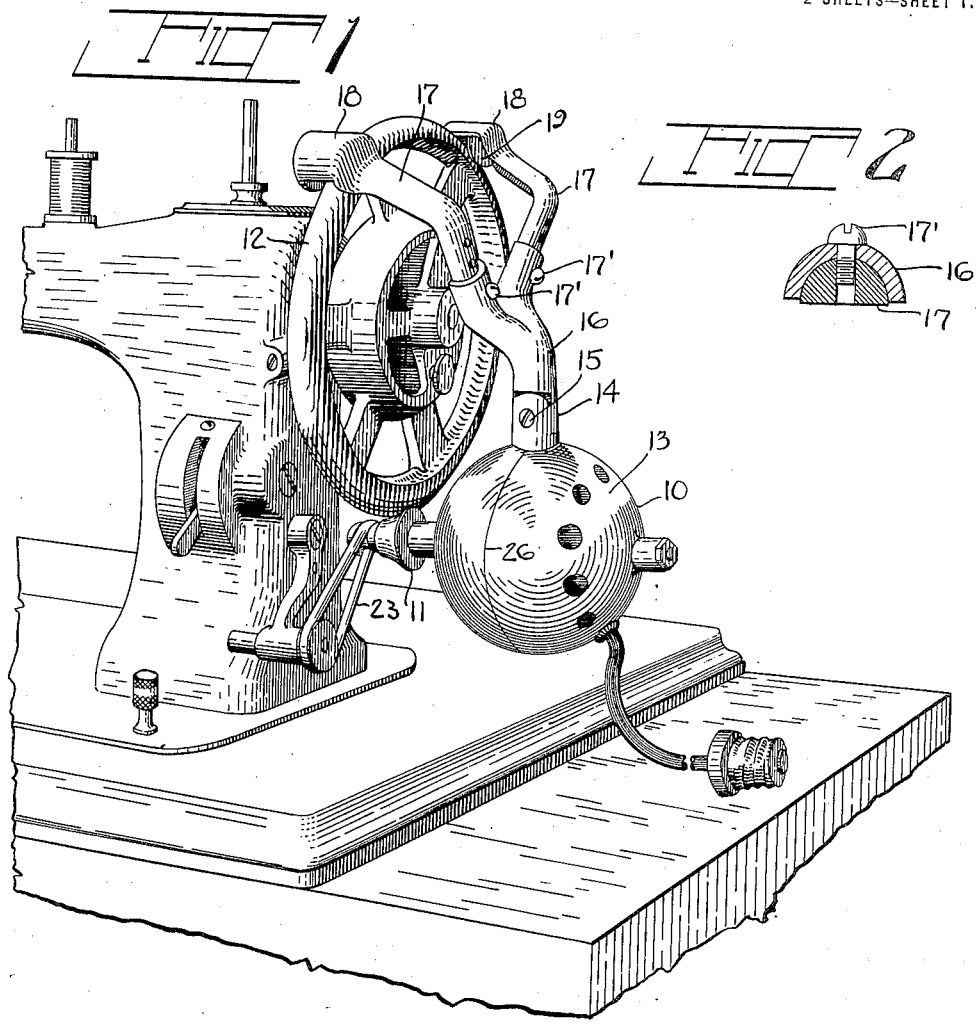
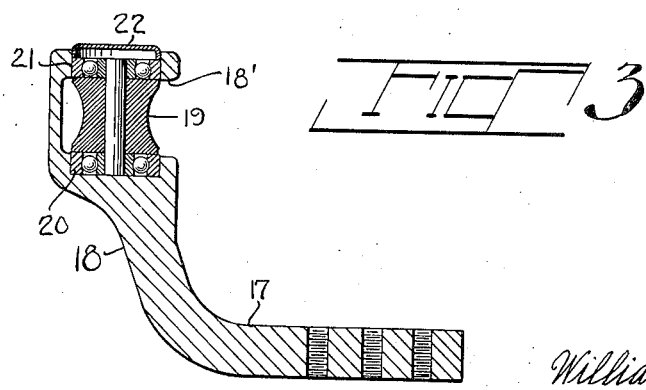
INVENTOR
William J. Brown.
BY
H. H. Dyke
ATTORNEY

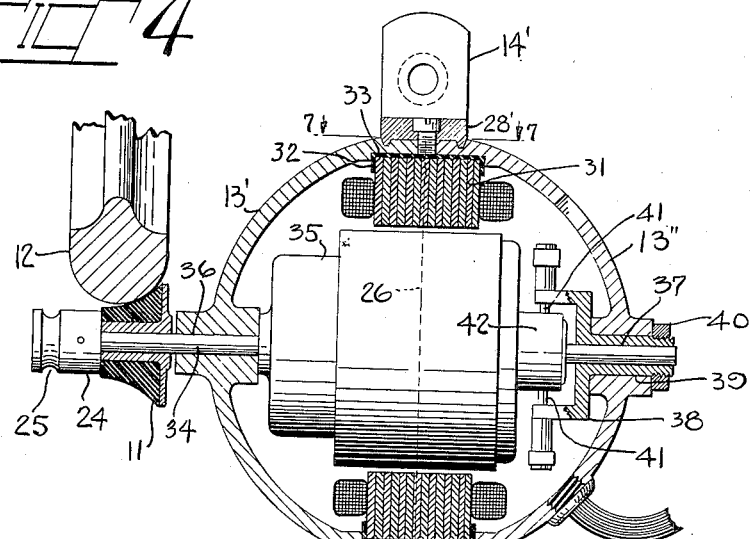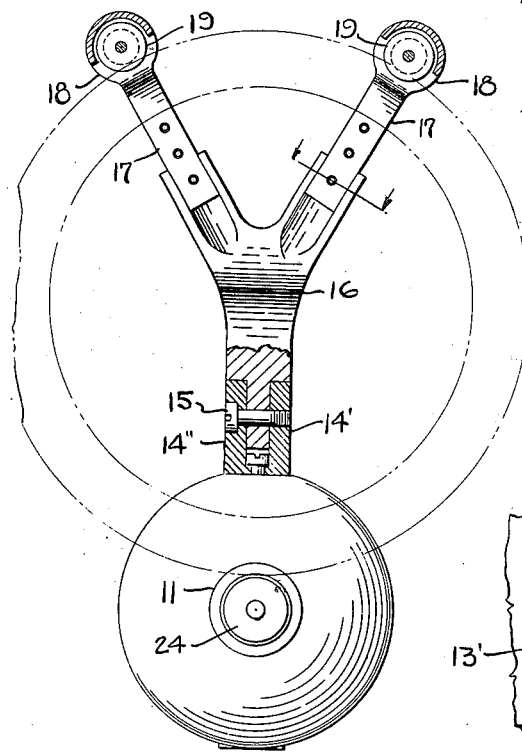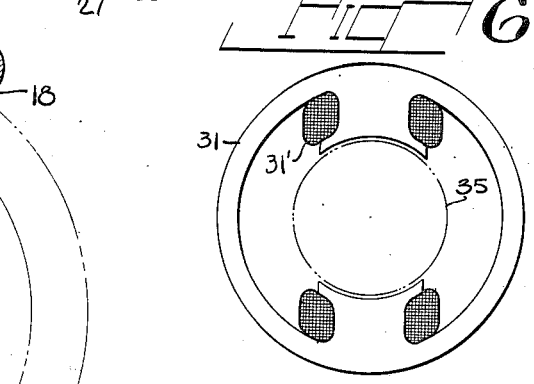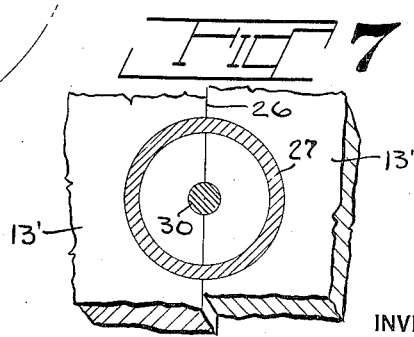

UNITED STATES PATENT OFFICE.

WILLIAM J. BROWN, OF NEWARK, NEW JERSEY.

SUSPENSION-DRIVE FOR SEWING-MACHINES.

1,398,498.    Specification of Letters Patent.    Patented Nov. 29, 1921.

Application filed January 23, 1920. Serial No. 353,449.

*To all whom it may concern:*

Be it known that I, WILLIAM J. BROWN, a citizen of the United States, and a resident of Newark, county of Essex, and State of New Jersey, have invented certain new and useful Improvements in Suspension-Drives for Sewing-Machines, of which the following is a specification.

My invention relates to a suspension drive for rotatable machine elements mounted to turn upon a shaft or axis. The invention is here illustrated in connection with a drive for sewing machines.

The driving mechanism of my invention is suspended from the driven wheel, and is preferably made adjustable so that it can be used on wheels of various forms and sizes.

The suspension is by means of idler wheels, preferably mounted on ball bearings, so as to run freely on the driven wheel, and with practically no frictional loss of power.

The driving means, preferably an electric motor with a driving pulley, is held against the driven wheel by gravity and preferably makes its driving contact at or near the lowest point of the driven wheel.

One form of apparatus in which the invention may be embodied is shown in the drawings, in which Figure 1 is a perspective view of driving mechanism applied to the hand wheel of a sewing machine. Figs. 2 and 3 are detail sectional views, Fig. 2 being taken on line 2—2, Fig. 5. Fig. 4 is a cross-section showing the preferred construction of electric motor; Fig. 5 is an end view of the suspension apparatus, partly in section, and viewed from the direction of the hand wheel, and Fig. 6 is a detail view of the motor field laminations and coils, and Fig. 7 is a cross-sectional detail view taken on the lines 7—7, 7—7, Fig. 4.

The driving device here shown as an electric motor 10, having a driving pulley 11, preferably of dished substantially conical form, is supported from the driven wheel, as the hand wheel 12 of a sewing machine, with the pulley 11 in engagement with the rim thereof. The motor casing 13, in the form shown, is pivotally connected at 14, by means of a frictional joint which can be made tight by screw 15, to a Y-shaped member 16. Said member 16 has a pair of arms 17 adjustably secured thereto, as, for example, by means of screws 17' passing through holes in member 16 and screwed into threaded holes in arms 17. Arms 17 have portions 18 adapted to overhang the wheel 12, and same are provided with concave idlers 19, which are received within recesses 18', and are adapted to ride and turn freely on wheel 12. With this arrangement, the support of the driving device upon the driven wheel is above the axis thereof and remote from the driving point or region, which in the form shown is at the bottom of the wheel, thereby providing a relatively stable support for the driving means. The idlers 19 are preferably mounted on ball bearings 20, and the opening 21 through which the idler and its bearings are inserted may be conveniently covered with the cap 22. A removable belt 23, of coiled wire or the like, is provided to take care of the bobbin winding drive, and the collar 24 which holds the pulley 11 in place may conveniently be provided with a groove 25 for receiving and driving belt 23.

The construction of the motor and its casing is preferably such that it can be conveniently and readily assembled and taken apart.

The shell or casing 13 is of substantially spherical form and is divided into halves 13' and 13" along the line 26. These sections are clamped together on one side by means of the flange 27 of disk 28 entering the groove 29, formed half in each of the casing parts 13' and 13", and held in place by screw 30. On the other side of the casing a similar arrangement is used, but in this case the flanged clamping member 28' is provided with extensions 14' and 14", by means of which the casing is connected to the Y-shaped member 16.

The field laminations 31, surrounded by a ring 32 of fiber or other similar material, are received in a groove 33 formed half in each of the casing portions 13', 13". The preferred form of field laminations 31 and coils 31' is shown in Fig. 6. The shaft 34 of armature 35 is inserted through a bearing opening 36 in casing portion 13', and through a bearing opening 37 in a brush holding member 38, which surrounds the shaft 34, and is in turn inserted through the opening 39 in the casing half 13". The member 38 is secured in place by nut 40 and carries the brushes 41 which make contact with commutator 42. The electrical windings and connections are not shown, any suitable arrangement, adapted for the purpose, being made use of. This provides a motor which is rugged, easily kept oiled, and readily assembled or taken apart.

It will be seen that by adjustment of the suspension means, such as angular adjustment at the pivot point 14, and adjusting the length of the arms 17, the drive mechanism may be suspended from driven wheels, such as the hand wheels of sewing machines, of various forms and sizes, so that the driving pulley makes proper driving contact therewith and, when once adjusted, to fit a given sewing machine hand wheel, for example, may be put into place thereon, or removed and put away with the utmost ease. The center of gravity of the motor being laterally displaced from its support, the driving contact is produced by the action of gravity, and no springs or other contact securing devices are needed. The apparatus, once put in place on the driven wheel, will not move away from the wheel, but maintains an effective driving relation during use. No extra parts are required to adapt the device to various machines, the single fixture being adapted for substantially universal use with various makes of sewing machines, and numerous other features of advantage are secured.

The apparatus illustrated is for affording an understanding of one form of my invention only and not for limitation of the invention, and changes and modifications may be resorted to without departing from my invention.

I claim:

1. The combination with an axially supported rotatable machine element, of means for imparting rotary movement to said element by frictional contact therewith applied therebeneath, and means for supporting the first named means from said rotatable machine element.

2. An attachment for sewing machine drive, comprising an electric motor and its driving pulley, and means for supporting same from the periphery of a wheel of the sewing machine.

3. An attachment for driving sewing machines, comprising an electric motor and its driving pulley, a substantially Y-shaped arm secured to the motor, and a pair of idlers carried by the branches of said arm and adapted to rest and turn upon the periphery of the sewing machine hand wheel.

4. An electric motor, a driving pulley therefor adapted to contact with and drive a wheel, and means adapted to rest and run upon the periphery of the driven wheel for supporting said electric motor with its center of gravity out of vertical alinement with the said supporting means.

5. An electric motor, a pulley therefor adapted to contact with a driven wheel at about the lowest portion thereof, a supporting two-armed frame for said motor extending laterally therefrom, and idlers on said arms adapted to rest and run upon the periphery of the driven wheel, whereby the center of gravity of the motor is laterally displaced from its supporting means and the pulley held in contact with the driven wheel by gravity.

6. An electric motor, a substantially conical drive pulley therefor, a pair of arms pivotally and adjustably connected to the motor, and idlers on said arms adapted to rest and run upon the periphery of a driven wheel with the drive pulley held in driving contact therewith by gravity.

7. An electric motor having a substantially conical drive pulley, a substantially Y-shaped member pivoted to the motor casing, a pair of arms adjustably secured to the branches of said member, said arms being provided with recesses on their inner sides, and a pair of idlers mounted in said recesses.

8. An electric motor having a two-part casing, a stud having a flange adapted to enter a groove formed partly in each casing part and serving to hold same together, a substantially conical drive pulley on the motor shaft, and a grooved collar on said shaft beyond the drive pulley and adapted to receive and drive a bobbin winding belt, a substantially Y-shaped member having a frictional pivoted connection to said stud, arms adjustably secured to the branches of said member, and concave idlers rotatably mounted in the inner sides of said arms.

In testimony that I claim the foregoing, I have hereto set my hand, this 22 day of January, 1920.

WILLIAM J. BROWN.